US009272711B1

(12) United States Patent
Sivaraman (10) Patent No.: US 9,272,711 B1
(45) Date of Patent: Mar. 1, 2016

(54) CONGESTION-FRIENDLY ADAPTIVE CRUISE CONTROL

(71) Applicants: VOLKSWAGEN AG, Wolfsburg (DE); AUDI AG, Ingolstadt (DE)

(72) Inventor: Sayanan Sivaraman, San Carlos, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 14/587,315

(22) Filed: Dec. 31, 2014

(51) Int. Cl.
| *B60W 30/16* | (2012.01) |
| *B60W 30/14* | (2006.01) |
| *G01S 13/88* | (2006.01) |
| *B60W 50/00* | (2006.01) |
| *G08G 1/16* | (2006.01) |
| *G08G 1/00* | (2006.01) |

(52) U.S. Cl.
CPC .............. *B60W 30/143* (2013.01); *B60W 30/16* (2013.01); *B60W 50/0097* (2013.01); *G01S 13/88* (2013.01); *G08G 1/161* (2013.01); *G08G 1/22* (2013.01); *B60W 2750/308* (2013.01); *Y02T 10/84* (2013.01)

(58) Field of Classification Search
CPC ............ B60W 30/16; B60W 50/0097; B60W 2750/308; B60W 30/143; G08G 1/161; G08G 1/22; Y02T 10/84; G01S 13/88
USPC ................................................... 701/96, 119
See application file for complete search history.

(56) References Cited

U.S. PATENT DOCUMENTS

| 7,089,099 | B2* | 8/2006 | Shostak | B60C 23/005 701/29.6 |
| 7,860,639 | B2* | 12/2010 | Yang | G08G 1/07 340/901 |
| 8,352,111 | B2 | 1/2013 | Mudalige | |
| 8,548,647 | B2* | 10/2013 | Nemoto | B60K 31/0058 701/2 |
| 8,768,597 | B2* | 7/2014 | Kagawa | B60W 30/16 701/117 |
| 2005/0192727 | A1* | 9/2005 | Shostak | B60C 11/24 701/37 |
| 2007/0075919 | A1* | 4/2007 | Breed | B60R 21/013 345/8 |
| 2011/0190972 | A1* | 8/2011 | Timmons | G01C 21/34 701/31.4 |

(Continued)

FOREIGN PATENT DOCUMENTS

| DE | 102005050720 A1 | 5/2007 |
| DE | 102010013647 A1 | 2/2011 |

(Continued)

*Primary Examiner* — Russell Frejd
(74) *Attorney, Agent, or Firm* — Barnes & Thornburg LLP (57) ABSTRACT

A congestion-based adaptive cruise control (ACC) system for a vehicle. A processor may provide control signals for the vehicle to modify at least one of acceleration, deceleration and braking in the vehicle. A radar sensor arrangement, operatively coupled to the processor, is configured to determine (i) a distance value for a front vehicle based on a front vehicle velocity, and (ii) a distance value for a rear vehicle based on a rear vehicle velocity. The processor may be configured to process (i) and (ii) from the radar sensor arrangement to determine a velocity value for the vehicle, and generate at least one control signal based on the velocity value to alter the velocity of the vehicle using at least one of acceleration, deceleration and braking to position the vehicle substantially at a mid-point between the front vehicle and rear vehicle.

20 Claims, 7 Drawing Sheets

(56) References Cited

U.S. PATENT DOCUMENTS

| | | | |
|---|---|---|---|
| 2012/0330527 A1 | 12/2012 | Kumabe et al. | |
| 2013/0116861 A1* | 5/2013 | Nemoto | B60W 30/16 701/2 |
| 2013/0138320 A1* | 5/2013 | Aso | B60W 30/16 701/96 |
| 2013/0151412 A1* | 6/2013 | Spahl | G06Q 20/40 705/44 |
| 2014/0172727 A1* | 6/2014 | Abhyanker | G06Q 30/0645 705/307 |
| 2014/0292545 A1* | 10/2014 | Nemoto | G08G 1/163 340/988 |

FOREIGN PATENT DOCUMENTS

| | | |
|---|---|---|
| WO | 2010068107 A1 | 6/2010 |
| WO | 2012014041 A1 | 2/2012 |

\* cited by examiner

CONGESTION-FRIENDLY ADAPTIVE CRUISE CONTROL

BACKGROUND

The present disclosure is directed to technologies and techniques for automatically controlling a vehicle. More specifically, the present disclosure is directed to positioning a vehicle between other vehicles and in turn distributing vehicle traffic and improving overall traffic performance and safety.

Adaptive cruise control (ACC) (also known as "autonomous cruise control" or "intelligent cruise control") has become popular over recent years in vehicle technology, and is a cruise control system for road vehicles that automatically adjusts the vehicle speed to maintain a safe distance from vehicles ahead. ACC technology is widely regarded as a key component of future generations of intelligent cars. Despite the use of ACC, individual vehicles, as well as vehicles as a collective whole travelling on a road segment, have not been able to effectively deal with congestive driving conditions. Among other effects, traffic "shockwaves" that lead to congestion are often caused by sudden braking of a front vehicle, which in turn causes a cascading and amplifying effect on vehicle braking rearwards, due to poor driver reaction time. What is needed is technologies for mitigating congestive effects by optimizing distances between vehicles.

SUMMARY

Various apparatus, systems and methods are disclosed for controlling acceleration, deceleration and/or braking for a vehicle to optimally position the vehicle between a front vehicle and a read vehicle. In an illustrative embodiment, a congestion-based adaptive cruise control (ACC) system for a vehicle is disclosed, comprising a processor means for providing control signals for the vehicle to modify at least one of acceleration, deceleration and braking in the vehicle; and a radar sensor arrangement, operatively coupled to the processor, the sensor arrangement being configured to determine (i) a distance value for a front vehicle based on a front vehicle velocity, and (ii) a distance value for a rear vehicle based on a rear vehicle velocity, wherein the processor means is configured to process (i) and (ii) from the radar sensor arrangement to determine a velocity value for the vehicle, and wherein the processor means is configured to generate at least one control signal based on the velocity value to alter the velocity of the vehicle using at least one of acceleration, deceleration and braking to position the vehicle substantially at a mid-point between the front vehicle and rear vehicle.

In another illustrative embodiment, a congestion-based adaptive cruise control (ACC) method for a vehicle is disclosed, comprising determining, by a sensor arrangement coupled to a processor, (i) a distance value for a front vehicle based on a front vehicle velocity, and (ii) a distance value for a rear vehicle based on a rear vehicle velocity; processing (i) and (ii) by the processor to determine a velocity value for the vehicle; and generating, by the processor, at least one control signal based on the velocity value to modify at least one of acceleration, deceleration and braking in the vehicle to position the vehicle between the front vehicle and rear vehicle.

In a further illustrative embodiment, a congestion-based adaptive cruise control (ACC) system for a vehicle is disclosed, comprising a processor for providing control signals for the vehicle to modify at least one of acceleration, deceleration and braking in the vehicle; and a sensor arrangement, operatively coupled to the processor, the sensor arrangement being configured to determine (i) a distance value for a front vehicle based on a front vehicle velocity, and (ii) a distance value for a rear vehicle based on a rear vehicle velocity, wherein the processor is configured to process (i) and (ii) from the sensor arrangement to determine a velocity value, and wherein the processor is configured to generate at least one control signal based on the velocity value to position the vehicle between the front vehicle and rear vehicle.

BRIEF DESCRIPTION OF THE FIGURES

The present invention is illustrated by way of example and not limitation in the figures of the accompanying drawings, in which like references indicate similar elements and in which.

DETAILED DESCRIPTION

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that the term "module" as used herein does not limit the functionality to particular physical modules, but may include any number of software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

Figure 1:
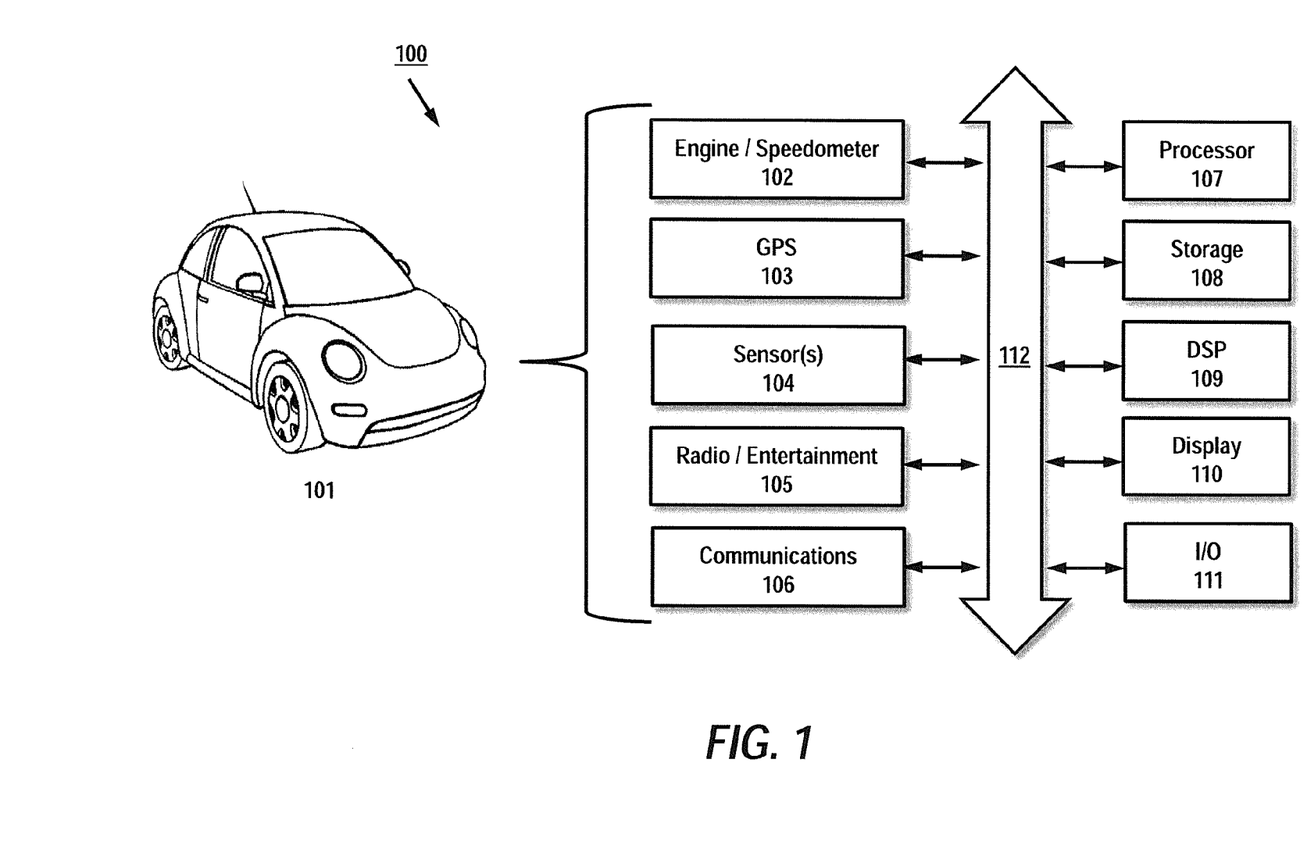
FIG. 1 illustrates an illustrative and simplified vehicle system block diagram showing multiple components and modules, together with a sensor arrangement for adaptive cruise control under an embodiment.

Turning to FIG. 1, the drawing illustrates an exemplary vehicle system 100 for vehicle 101 comprising various vehicle electronics modules, subsystems and/or components. Engine/transmission module 102 is configured to process and provide vehicle engine and transmission characteristic or parameter data, and may comprise an engine control unit (ECU), and a transmission control. For a diesel engine, module 102 may provide data relating to fuel injection rate, emission control, NOx control, regeneration of oxidation catalytic converter, turbocharger control, cooling system control, and throttle control, among others. For a gasoline engine, module 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals.

Global positioning system (GPS) module 103 provides navigation processing (see FIG. 5), location data and traffic data for vehicle 101. Sensors 104 provides sensor data which may comprise data relating to vehicle characteristic and/or parameter data (e.g., from 102), and may also provide environmental data pertaining to the vehicle, its interior and/or surroundings, such as temperature, humidity and the like. As will be explained in further detail below, sensors 104 also include object detection sensors, such as radar, Light Detection and Ranging (LIDAR), GPS, and computer vision. Radio/entertainment module 105 may provide data relating to audio/video media being played in vehicle 101. Module 105 may be integrated and/or communicatively coupled to an entertainment unit configured to play AM/FM radio, satellite radio, compact disks, DVDs, digital media, streaming media and the like. Communications module 106 allows any of the modules to communicate with each other and/or external devices via a wired connection or wireless protocol, such as Wi-Fi, Bluetooth, NFC, etc. In one embodiment, modules 102-106 may be communicatively coupled to bus 112 for certain communication and data exchange purposes.

Vehicle 101 may further comprise a main processor 107 that centrally processes and controls data communication throughout the system of FIG. 1, and may provide control signals to any module to enable, disable or modify operation. For example, processor 107 may provide intermittent braking, short braking and/or extended braking signals to effect one or more braking operations on vehicle 101. In another example, processor 107 may provide acceleration and/or deceleration signals to control the velocity of vehicle 101. In other examples, processor 107 may provide a combination or series of braking, acceleration/deceleration signals. Processor 107 may be configured as a single processor, or may be configured as a plurality of processors, sub processors and/or processing modules. Storage 108 may be configured to store instructions, data, software, media, files and the like. In some illustrative embodiments, storage 108 includes instructions and data for effecting ACC operations under control of processor 107 discussed in greater detail below. Digital signal processor (DSP) 109 may comprise a processor separate from main processor 107, or may be integrated within processor 107. Generally speaking, DSP 109 may be configured to take signals, such as sensor signals, voice, audio, video, temperature, pressure, position, etc. that have been digitized and then process them as needed. Display 110 may be configured to provide visual (as well as audio) indicial from any module in FIG. 1, and may be a configured as a LCD, LED, OLED, or any other suitable display. Display may also be configured with audio speakers for providing audio output. Input/output module 111 is configured to provide data input and outputs to/from other peripheral devices, such as keyboards, key pads, joysticks, knobs, key fobs, device controllers and the like. As discussed above, modules 107-111 may be communicatively coupled to data bus 112 for transmitting/receiving data and information to/from other modules.

Figure 2:
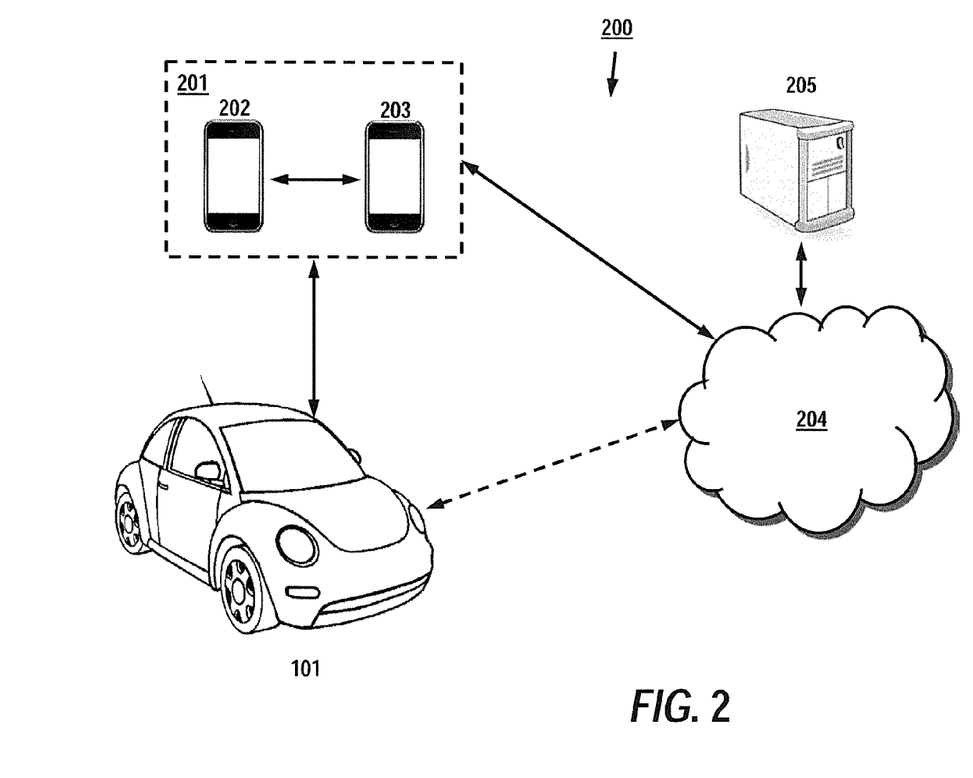
FIG. 2 is an illustrated and simplified block diagram illustrating the vehicle of FIG. 1 communicatively coupled to one or more portable devices and a computer network under an embodiment.

Turning to FIG. 2, an exemplary embodiment is illustrated, where a vehicle 101 (see FIG. 1), is paired with one or more devices 201 (202, 203) which may be registered to one or more users. Devices 201 may be registered with vehicle 101 using Bluetooth pairing or using WiFi or NFC registration, as is known in the art. Preferably, device 201 registrations are stored at the vehicle (e.g., 108) according to a device ID or SIM ID, and may further include a device user profile associated with each ID that may include vehicle settings, vehicle function preferences, demographic data, and/or user device/vehicle history. In the embodiment of FIG. 2, devices 202, 203 may configured to communicate data with vehicle 101, and may be further configured to communicate with each other. Portable devices 201 are also configured to communicate with wireless network 204 in order to send/receive data from a central server 205. Similarly, in one embodiment, vehicle 101 may also be configured to communicate with network 204. Server 205 may be also configured to perform back-end processing for devices 201 and vehicle 101, and further communicate with other remote servers for additional functionalities.

Figure 3:
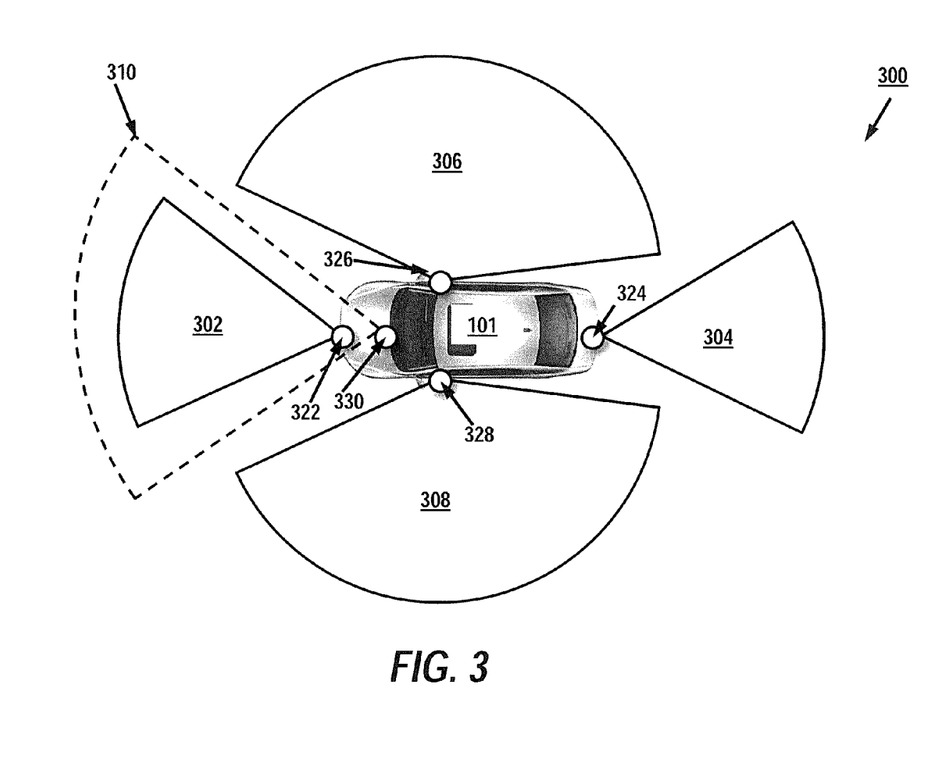
FIG. 3 is an illustrative and simplified example of a vehicle sensor arrangement for detecting objects around a periphery of the vehicle of FIG. 1 for ACC purposes under an embodiment.

Turning to FIG. 3, an exemplary vehicle traffic sensor arrangement 300 is illustrated, where front (322), rear (324), right (326) and left (328) side object detection sensors and a lane camera 330 are employed. Each of the aforementioned sensors and lane camera are considered sensors 104 for the purposes of vehicle system 100 discussed above in connection with FIG. 1, and are communicatively coupled to processor 107. One or more front sensors 322 of vehicle 101 provides a front object sensing area 302 and one or more rear sensors 324 provide a rear sensing area 304, while one or more right side sensors 326 provide a right side sensing area 306 and one or more left side sensors 328 provide a left side sensing area 308. Lane camera 330 (or "lane assist camera") provides a video camera to detect the lane markings ahead of the vehicle as shown in 310. If lane camera 330 detects that the vehicle is getting too close to the side of its lane, processor 107 may initiate a counter steer to keep the vehicle laterally in the lane applying counter-steering or by applying braking power to individual wheels.

Vehicle traffic sensor arrangement 300 is configured to operate as an ACC system by monitoring and regulating the distance of vehicle 101 to front and rear vehicles to make driving easier for drivers, particularly in congested ("stop-and-go") traffic. Under an exemplary operation, a driver may pre-set an initial speed range (e.g., via I/O 111) and/or distances to front and rear vehicles which the driver wants the ACC to brake, accelerate and decelerate the car within. The driver may restrict the vehicle 101 speed to the limit of the road, for example. The distance-optimizing technology builds on the cruise control platform by adding a front and rear radar sensor. For the front sensor 322, it immediately detects traffic ahead and automatically increases/reduces the velocity (speed) to match. If vehicle 101 is driving too close to the car in front, system 300 may warn the driver in two stages. First, with visual and acoustic signals (e.g., via display 210), and then with a short braking jolt activated by processor 107. If necessary, the system 300 will bring vehicle 101 to a complete stop.

The rear sensor 324 similarly detects traffic behind and automatically increases/decreases the velocity so that vehicle 101 is positioned at an optimum distance between the front and rear vehicle. In one example, the front and rear radar sensors may have a range of up to 200 meters and a beam angle of 12 degrees. Of course, other ranges and beam angles are contemplated in the present disclosure and may be utilized by those skilled in the art. The radar sensors 322, 324 may also comprise respective control units that further may be combined into a single unit that communicates with processor 107. In another embodiment, readings from the sensors 322, 324 may be directly provided to processor 107, which would perform computational processing for detecting vehicle distances and relative speeds.

In one embodiment, signals from the radar sensors are provided to respective control units (and/or processor 107) to compute the distance to the vehicle ahead, the vehicle behind, and the vehicle's speed relative to it. Radar signals may be filtered (e.g., via a Kalman filter) to more accurately provide tracking and estimation for vehicle 101. In certain embodiments, a lateral position from sensors 326, 328 may be determined as well. If there are several vehicles within the sensor field of coverage at the same time, the lateral information and/or information from lane camera 330 may be used to select which of the vehicles the system 300 should track. If approaching a slower vehicle ahead or if another vehicle cuts in front, the adaptive cruise control system 300 slows down the car by initiating corrective controls in the engine management and, if necessary, in the braking system as well. In one embodiment, if the required rate of deceleration exceeds 30% of the vehicle's maximum stopping power, visual and audible warning signals will prompt the driver to apply the brakes manually.

Figure 4A:
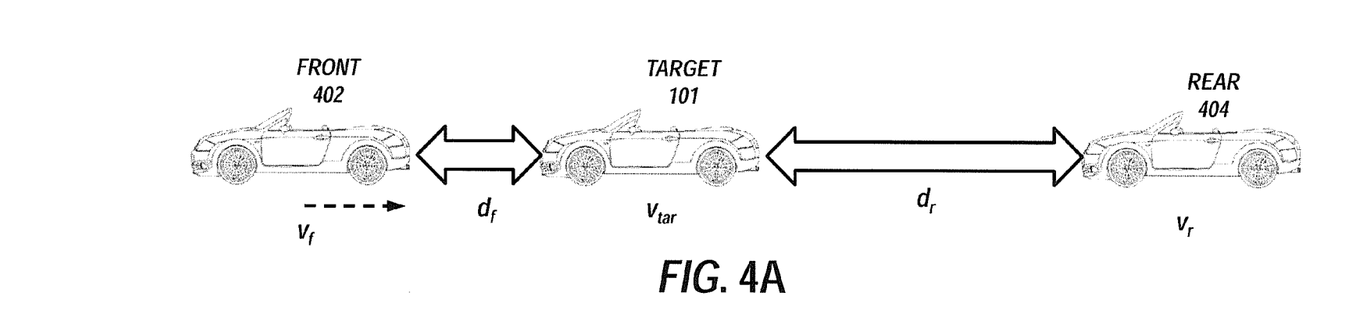
FIGS. 4A-4C are illustrative embodiments of optimizing distances for a target vehicle, such as the vehicle of FIG. 1, relative to a front and a rear vehicle under an embodiment.
Figure 4B:
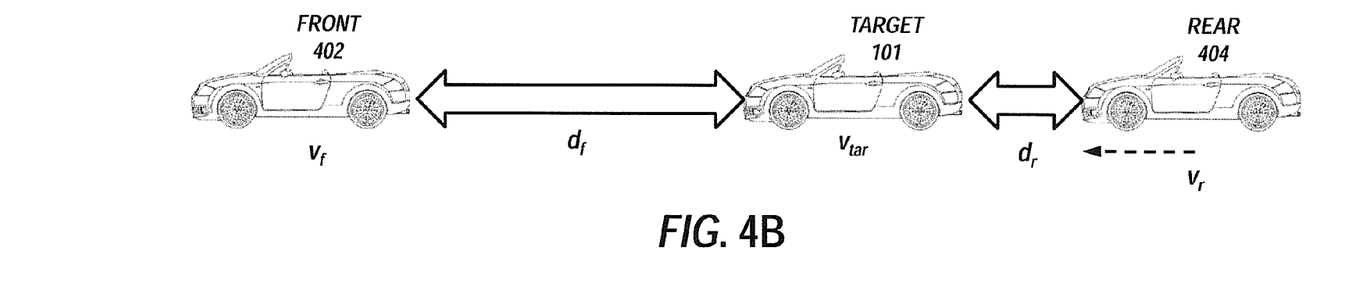
Figure 4C:
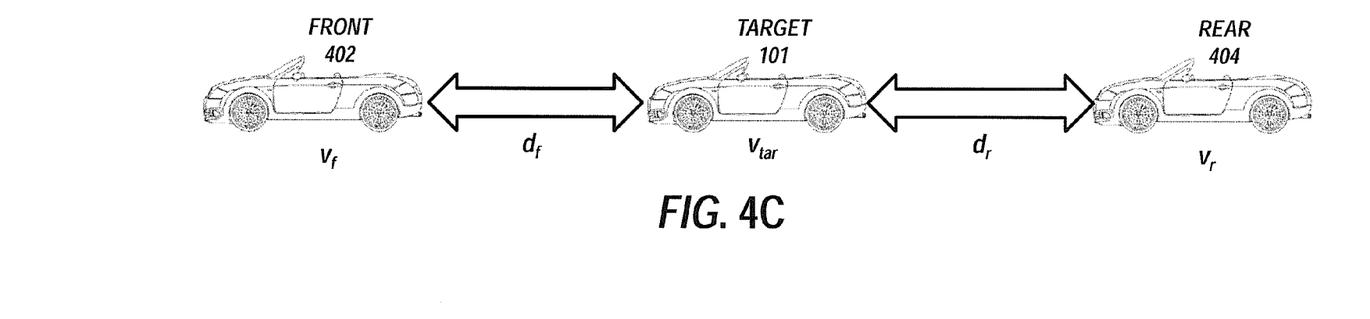

Referring now to FIGS. 4A-4C, illustrative embodiments are provided for effecting congestive ACC utilizing any of the arrangements described herein. In each of embodiments, 4A-4C, reference is made to a front vehicle 402, a rear vehicle 404 and a target vehicle 101 in which congestion mode ACC is effected. Front vehicle 402 is shown as traveling at a velocity (speed) of $v_f$ and having a distance $d_f$ from target vehicle 101. Rear vehicle 404 is shown as having a velocity of $v_r$ and having a distance $d_r$ from target vehicle 101. Target vehicle 101 is shown as traveling with a velocity of $v_{tar}$.

If a congestion mode is detected in vehicle 101 (discussed in greater detail below), target vehicle 101 begins adjusting its velocity using ACC to optimize target vehicle 101 position to be substantially at a mid-point between front vehicle 402 and rear vehicle 404. For the purposes of the present disclosure, "substantially" may refer to a mid-point that is within 30% of a physical midpoint between vehicles 402 and 404. Under various embodiments, target vehicle 101 may calculate an absolute position using $$x_{tar}(\Delta t) = \frac{1}{2}(v_{tar}(\Delta t) + v_{tar})\Delta t \tag{1}$$

where $x_{tar}$ represents the absolute position of target vehicle 101, $v_{tar}$ represents the velocity of the target vehicle 101, and t represents time. The absolute position of the front vehicle $x_f$ ($\Delta t$) may be determined by $$x_f(\Delta t) = v_f \Delta t \tag{2}$$

where $v_f \Delta t$ represents the velocity of the front vehicle over a time interval. Similarly, the position of the rear vehicle $x_r(\Delta t)$ may be determined by $$x_r(\Delta t) = v_r \Delta t \tag{3}$$

where $v_r \Delta t$ represents the velocity of the rear vehicle over a time interval.

Accordingly, a distance to the front vehicle 402 and rear vehicle 404 may be determined from $$d_f(\Delta t) = d_f + v_f \Delta t - x_{tar}(\Delta t) \tag{4}$$

and $$d_r(\Delta t) = d_r + x_{tar}(\Delta t) - v_r \Delta t \tag{5}$$

where $d_f(\Delta t)$ represents the distance of the front vehicle 402 over time period $\Delta t$ and $d_r(\Delta t)$ represents the distance of the rear vehicle 404 over time period $\Delta t$ relative to the position $x_{tar}$ of target vehicle 101. From this, an optimized target vehicle 101 velocity over time $v_{tar}(\Delta t)$ can be determined from $$v_{tar}(\Delta t) = \frac{1}{\Delta t}(d_f - d_r) + v_f + v_r - v_{tar} \tag{6}$$

Using this configuration, a target vehicle 101 may optimally be positioned substantially between front vehicle 402 and rear vehicle 404.

Referring to FIG. 4A, illustrative embodiments are shown where, in these examples, target vehicle 101 is traveling at an initial velocity $v_{tar}$ and front vehicle 402 suddenly decreases velocity $v_f$ (shown by dotted arrow) resulting in a decrease in distance $d_f$ between target vehicle 101 and front vehicle 402. As target vehicle compensates $v_{tar}$ for the decrease in distance using algorithms (1)-(6) in FIG. 4B, rear vehicle 404 increases velocity $v_r$ (shown by dotted arrow), which now decreases distance $d_r$ to target vehicle 101. Again, using algorithms (1)-(6), target vehicle 101 adjusts $v_{tar}$ again to arrive at a substantial midpoint between front vehicle 402 and rear vehicle 404 as shown in FIG. 4C (i.e., $d_f \approx d_r$).

Assuming front vehicle 402 and rear vehicle 404 maintain a relatively constant velocity, target vehicle 101 will maintain its position at substantially the mid-point between them as shown in FIG. 4C. Of course, target vehicle 101 will be able to dynamically readjust the mid-point as velocities/distances of the front 402 and rear 404 vehicles changes. For example, if the velocity $v_f$ front vehicle 402 increases while velocity $v_r$ of rear vehicle 404 remains constant, target vehicle 101 will increase velocity $v_{tar}$ to arrive at a new mid-point, and in turn increasing distances $d_f$ and $d_r$. Similarly, if the velocity $v_f$ front vehicle 402 remains constant while velocity $v_r$ of rear vehicle 404 increases, target vehicle 101 will increase velocity $v_{tar}$, to arrive at a new mid-point, and in turn decreasing distances $d_f$ and $d_r$.

It can be appreciated by those skilled in the art that various other target vehicle 101 configurations are contemplated in the present disclosure. For example, while the term "mid-point" has been used to signify a target vehicle position that is substantially equidistance from a front vehicle 402 and rear vehicle 404, it is also possible to apply weighted mid-points so that target vehicle 101 maintains a relative mid-point between a front 402 and rear 404 vehicle. For example, by weighting either of the distances $d_f$, $d_r$, a relative mid-point may be established such that the target vehicle 101 maintains a greater distance relative to one of front 402 and rear 404 vehicles. In other words, assuming a 1.2 weight factor in an example, target vehicle 101 may maintain a mid-point having a front vehicle distance $d_f$ that is 20% greater than the rear vehicle distance, or vice versa. Such a configuration may be advantageous in situations where vehicle sensors detect a smaller (e.g., motorcycle) or larger (e.g., transport truck) vehicle as a front or rear vehicle. For example, if target vehicle 101 sensors determine a large truck is to the rear of target vehicle 101, a weight factor may be applied to increase the distance to the rear vehicle to compensate for the fact that the large vehicle will require a greater amount of time to react to variances in target vehicle's velocity $v_{tar}$.

Figure 5:
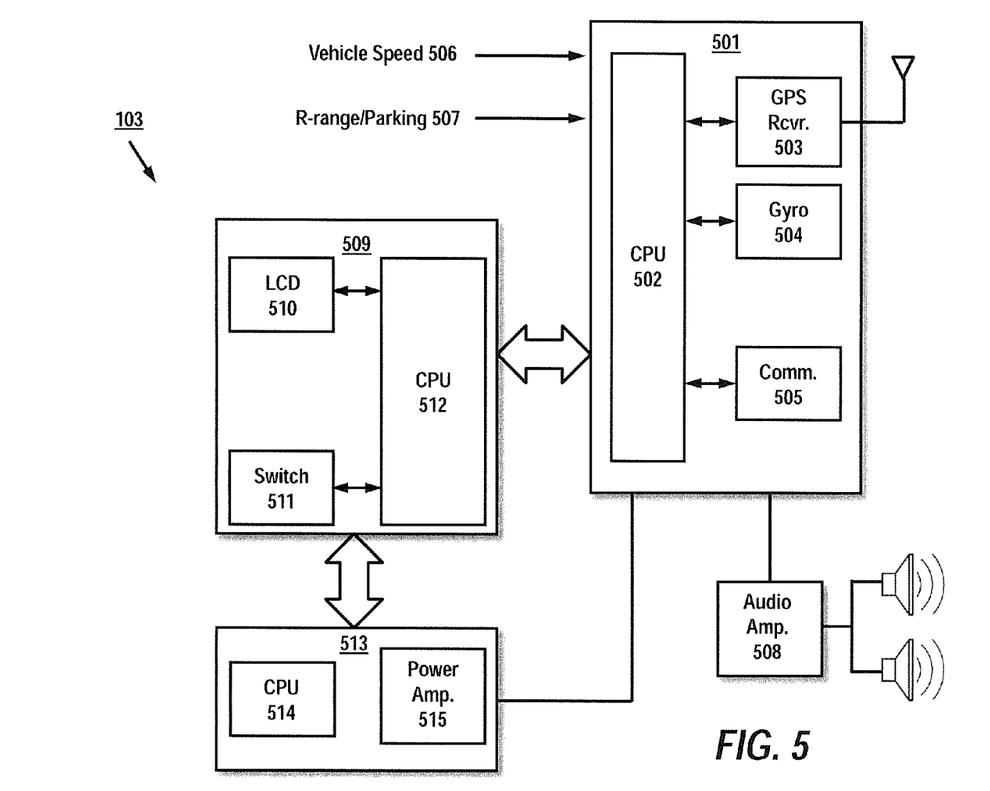
FIG. 5 is an illustrative and simplified block diagram of a navigational information system suitable for use in the vehicle of FIG. 1.

While congestion-based ACC technologies disclosed herein may rely on vehicle sensor information and vehicle data (e.g., via controller area network (CAN) vehicle bus), other embodiments may also rely on navigation information for determining and/or setting congestion modes for a vehicle to implement congestion-based ACC. Turning now to FIG. 5, an exemplary vehicle navigation system is disclosed comprising a car navigation unit 501 comprising a CPU 502, GPS receiver 503 and gyroscope 504. Additionally, navigation unit 501 may include communications 505, allowing navigation unit 501 to communicate with portable devices, such as device 200, discussed above. Navigation unit may receive vehicle speed signal 506 and R-range/parking signal 507 to track vehicle movement and status. Navigation unit 501 utilizes GPS receiver 503 to acquire position data to locate the user on a road in the unit's map database. Using a road database, unit 501 can give directions to other locations along roads also in its database. Dead reckoning using distance data from sensors attached to the drivetrain, gyroscope 505 and an accelerometer (not shown) can be used for greater reliability, as GPS signal loss and/or multipath can occur due to urban canyons or tunnels.

The road database for navigation unit 501 may be a vector map containing some area of interest. Street names or numbers and house numbers may be encoded as geographic coordinates so that a user can find some desired destination by street address or by a generic or specific name. Points of interest (waypoints) may also be stored with their geographic coordinates. Point of interest specialties include speed cameras, fuel stations, public parking, and so forth. Contents can be produced by the user base as a vehicle drive along existing streets (cellular, Wi-Fi) and communicating via the internet, yielding an up-to-date map. Navigation mapping formats may include geographic data files (GDF), and may also include other formats, such as CARiN, SDAL and NDS PSF. Navigation unit 501 may be further coupled to LCD unit 509 and audio unit 513, where LCD unit 509 may comprise LCD screen 510, CPU 512 and on/off switch 511. Audio unit 513 may comprise CPU 514 and power amplifier 515. Output of audio unit 513 may be forwarded to audio amplifier 408 for output to a user.

Navigation unit 501 may further be advantageously configured to receive traffic data directly from external sources via communications 505, or alternately via a portable device (202-203), wherein the portable device communicates traffic data to navigation unit 501 via communications 505. Traffic data may be acquired from traffic data suppliers, such as traffic.com and INRIX, where such suppliers acquire and collect traffic data from road sensors, local departments of transportation, data collected from operators of large fleets of vehicles, and other manual sources such as traffic helicopters and acquiring traffic data from police scanners. Traffic data may be provided using a plurality of delivery methods. One exemplary method is through a wireless data system such as MSN Direct, where traffic data is collected by traffic.com and sent over wireless airwaves to a receiver that is either built into the GPS or added as an external antenna. Another exemplary method of delivery is via a "silent" transmission over FM radio.

In addition to audio heard from a radio station (e.g., via radio/entertainment module 105), other "silent" signals can be sent over the frequency. A special FM antenna may either be built into the navigation unit 501 or connected as an antenna which listens for the special signals being broadcast over FM radio frequencies. Yet another exemplary method for traffic data delivery may include utilizing a data connection from a portable device (202-203). The portable device may be configured to connect to the Internet over the device's cellular connection, downloads the traffic information, and sends it via Bluetooth or other suitable means to the navigation unit 501.

Traffic data may be delivered using a plurality of data types that can be received about the road network. Two exemplary data types comprise incident data and traffic flow data. Incident data refers to information generally about a specific point/event on a road such as an accident or construction work. Flow data refers to the average speed vehicles are currently traveling on a particular section of road. In one embodiment, navigation system 501 is configured to receive both types of data. This would be advantageous, for example, if a road only has incident coverage, and unexpected bad weather causes traffic to back up. As this scenario may not be detected by incident data (since there technically is not a particular accident causing slower traffic), dual coverage that includes flow data would detect the back up more efficiently.

Figure 6:
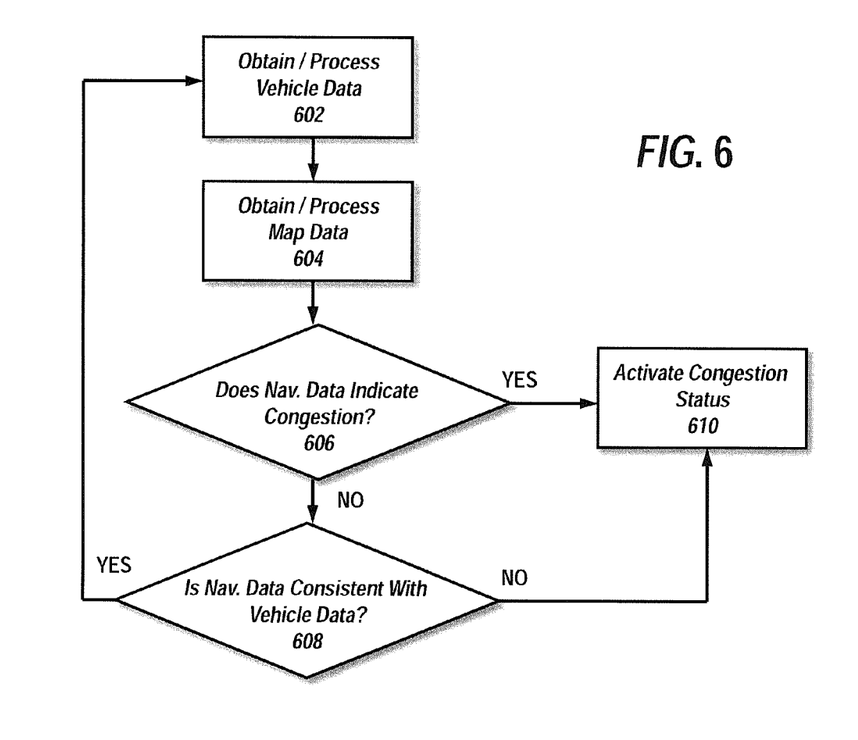
FIG. 6 illustrates a simplified flow diagram for detecting a traffic congestion condition utilizing vehicle sensor and/or navigational information and activating a congestion status for vehicle ACC under an embodiment.

Turning to FIG. 6, a process is shown for determining and activating a congestion status for triggering congestion-based ACC in an illustrative embodiment. The process begins at block 602 where processor 107 obtains and processes vehicle data, which includes vehicle use characteristics such as acceleration, speed, average speed, braking, braking frequency etc. Next in block 604, the navigation unit obtains and processes navigational system data, which includes any of the traffic data discussed above. Processor 107 then determines in block 606 if navigation data indicates congestion in an area traveled by vehicle 101. If, in determination block 606, it is determined that congestion exists ("YES"), the process moves to block 610, where congestion-based ACC is activated in vehicle 101. If, in determination block 606, it is determined that congestion is not detected ("NO"), the process moves to decision block 608, where it is determined if the vehicle data is consistent with the navigational system data.

In block 608, the processor 107 determines if vehicle use characteristics, such as acceleration, speed, average speed, braking, braking frequency etc. are consistent with the navigational system data, which does not indicate the presence of congestion. In this example, the navigation data may not be up-to-date or aware of newly-forming congestion. By automatically obtaining vehicle usage characteristics and subjecting them to one or more various threshold-based processing techniques, the vehicle 101 may determine for itself if a congestion status is warranted. If one or more vehicle characteristics to not meet or exceed threshold congestion requirements and show a consistency with the navigational data ("YES"), the process reverts back to block 602 to continue further collection and processing of vehicle data. If one or more vehicle characteristics meet or exceed threshold congestion requirements and show an inconsistency with the navigational data ("NO"), this indicates potentially forming/formed congestion, and the process continues to block 610 where a congestion status is activated for the vehicle 101.

In some embodiments, in addition to activation the congestion-based ACC in block 610, vehicle 101 may further transmit a signal, indicating that congestion-based ACC has been activated, to a network node (e.g., server 205). The signal may include a geographic location of the activation provided by the vehicle 101 or a portable device 201 linked to the vehicle. The network node (e.g., server 205) may collect and count the individual activations and geographic locations, and use this information to update navigational data to indicate congestion when a sufficient number of activations in a geographic area are detected. Such a configuration advantageously automates and quickly updates navigational data for subsequent vehicles. Thus, as an example, after numerous vehicles transmit that congestion-based ACC was activated in their respective vehicles, the system 200 may modify navigational information for a surrounding area. As new vehicles enter the surrounding area, navigational data in block 606 of FIG. 6 would automatically indicate congestion to trigger congestion-based ACC in block 610 for the new vehicles.

Figure 7:
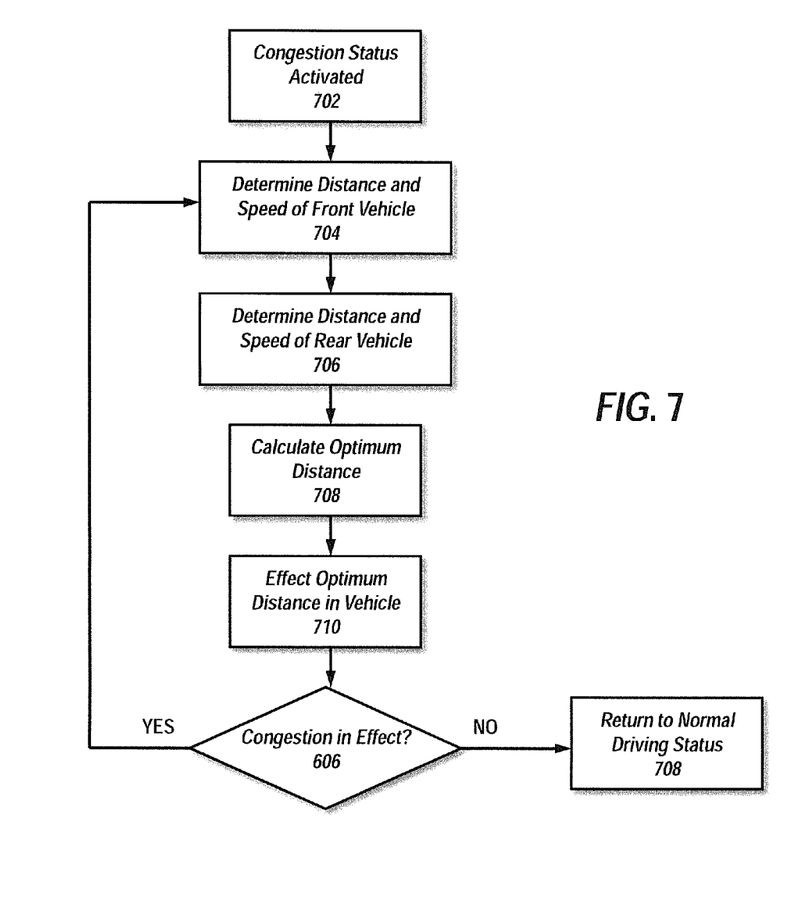
FIG. 7 illustrates a simplified flow diagram for performing target vehicle distance optimization relative to a front and rear vehicle during a vehicle congestion status mode of operation.

Turning to FIG. 7, a simplified flow diagram is shown for performing target vehicle distance optimization relative to a front and rear vehicle during a vehicle congestion status mode of operation. The process begins at block 702, where congestion-based ACC is activated. In block 704, the vehicle sensors determine a distance and speed of a front vehicle, and determine, in block 706 a distance and speed of a rear vehicle. It should be understood by those skilled in the art that, while blocks 704 and 706 are shown sequentially in FIG. 7, the functions of each block may be performed in parallel (i.e., at the same time). Once the speed and distance of a front and read vehicle are determined, vehicle 101 calculates an optimum congestive distance (discussed above, in connection with FIGS. 3 and 4A-4C) in block 708 between the vehicles. In block 710, vehicle processor 107 initiates one or more actions for vehicle modules (e.g., acceleration, deceleration, braking, etc.) to effect the optimum distance position for vehicle 101.

In decision block 606, vehicle determines if a congestion status is in effect. This determination may be made from navigational data, discussed above in connection with FIG. 6, or may be determined from distance/speed sensor measurements from vehicle 101. For example, if front and/or rear vehicle distances are beyond a set threshold (i.e., vehicles are too far forward and/or too far back, average velocity increasing towards posted speed limit), this data would be indicative of traffic clearing up from a congestive state. If vehicle 101 determines that a congestive state is no longer in effect ("NO"), the process continues to block 708, in which vehicle 101 returns to a normal driving status. If however, a congestive state is still in effect ("YES"), the process moves back to block 704/705 in which the distance and velocity of front and rear vehicles continue to be monitored for ACC purposes.

It can be appreciated that the various embodiments disclosed herein provide an efficient and effective means for mitigating congestive effects of driving, while maintaining a reasonable degree of safety for a driver. Additionally, by equipping numerous vehicles with congestive ACC capabilities, the equipped vehicles may collectively act in a "swarming effect" manner to mitigate congestion, or even avoid congestion before it has an opportunity to fully form by distributing vehicles within a traffic cluster.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A congestion-based adaptive cruise control (ACC) system for a vehicle, comprising:
   a processor means for providing control signals for the vehicle to modify at least one of acceleration, deceleration and braking in the vehicle; and
   a radar sensor arrangement, operatively coupled to the processor, the sensor arrangement being configured to determine (i) a distance value for a front vehicle based on a front vehicle velocity, and (ii) a distance value for a rear vehicle based on a rear vehicle velocity,
   wherein the processor means is configured to process (i) and (ii) from the radar sensor arrangement to determine a velocity value for the vehicle, and wherein the processor means is configured to generate at least one control signal based on the velocity value to alter the velocity of the vehicle using at least one of acceleration, deceleration and braking to position the vehicle substantially at a mid-point between the front vehicle and rear vehicle.

2. The congestion-based ACC system of claim 1, wherein (i) is determined from $$d_f(\Delta t) = d_f + v_f \Delta t - x_{tar}(\Delta t)$$

wherein $d_f(\Delta t)$ represents an absolute distance of the front vehicle over a time period $\Delta t$, $d_f$ represents the front vehicle distance, $v_f \Delta t$ represents an absolute velocity of the front vehicle, and $x_{tar}(\Delta t)$ represents an absolute position of the vehicle, and wherein (ii) is determined from $$d_r(\Delta t)=d_r+x_{tar}(\Delta t)-v_r\Delta t$$

wherein $d_r(\Delta t)$ represents an absolute distance of the rear vehicle over the time period $\Delta t$, $d_r$ represents the rear vehicle distance, $v_r\Delta t$ represents an absolute velocity of the rear vehicle, and $x_{tar}(\Delta t)$ represents the absolute position of the vehicle.

3. The congestion-based ACC system of claim 2, wherein the velocity value for the vehicle $v_{tar}(\Delta t)$ is determined from $$v_{tar}(\Delta t) = \frac{1}{\Delta t}(d_f - d_r) + v_f + v_r - v_{tar}.$$

4. The congestion-based ACC system of claim 1, wherein the processor means is configured to process (i) and (ii) from the sensor arrangement to determine the velocity value if the processor means determines a congestion status is active.

5. A congestion-based adaptive cruise control (ACC) method for a vehicle, comprising:
   determining, by a sensor arrangement coupled to a processor, (i) a distance value for a front vehicle based on a front vehicle velocity, and (ii) a distance value for a rear vehicle based on a rear vehicle velocity;
   processing (i) and (ii) by the processor to determine a velocity value for the vehicle; and
   generating, by the processor, at least one control signal based on the velocity value to modify at least one of acceleration, deceleration and braking in the vehicle to position the vehicle between the front vehicle and rear vehicle.

6. The congestion-based ACC method of claim 5, wherein generating the at least one control signal comprises generating the at least one control signal to position the vehicle substantially at a mid-point between the front vehicle and rear vehicle.

7. The congestion-based ACC method of claim 5, wherein (i) is determined from $$d_f(\Delta t)=d_f+v_f\Delta t-x_{tar}(\Delta t)$$

wherein $d_f(\Delta t)$ represents an absolute distance of the front vehicle over a time period $\Delta t$, $d_f$ represents the front vehicle distance, $v_f\Delta t$ represents an absolute velocity of the front vehicle, and $x_{tar}(\Delta t)$ represents an absolute position of the vehicle, and wherein (ii) is determined from $$d_r(\Delta t)=d_r+x_{tar}(\Delta t)-v_r\Delta t$$

wherein $d_r(\Delta t)$ represents an absolute distance of the rear vehicle over the time period $\Delta t$, $d_r$ represents the rear vehicle distance, $v_r\Delta t$ represents an absolute velocity of the rear vehicle, and $x_{tar}(\Delta t)$ represents the absolute position of the vehicle.

8. The congestion-based ACC method of claim 7, wherein the velocity value for the vehicle $v_{tar}(\Delta t)$ is determined from $$v_{tar}(\Delta t) = \frac{1}{\Delta t}(d_f - d_r) + v_f + v_r - v_{tar}.$$

9. The congestion-based ACC method of claim 7, wherein processing (i) and (ii) to determine the velocity value for the vehicle occurs when a congestion status is determined to be active.

10. The congestion-based ACC method of claim 9, further comprising receiving, by vehicle sensors, vehicle use characteristic data, wherein the congestion status is determined to be active using the vehicle use characteristics.

11. The congestion-based ACC method of claim 9, further comprising receiving traffic information in a navigation system from a network, wherein the congestion status is determined to be active using the traffic information.

12. The congestion-based ACC method of claim 5, wherein the sensor arrangement comprises radar sensors.

13. A congestion-based adaptive cruise control (ACC) system for a vehicle, comprising:
   a processor for providing control signals for the vehicle to modify at least one of acceleration, deceleration and braking in the vehicle; and
   a sensor arrangement, operatively coupled to the processor, the sensor arrangement being configured to determine (i) a distance value for a front vehicle based on a front vehicle velocity, and (ii) a distance value for a rear vehicle based on a rear vehicle velocity,
   wherein the processor is configured to process (i) and (ii) from the sensor arrangement to determine a velocity value, and wherein the processor is configured to generate at least one control signal based on the velocity value to position the vehicle between the front vehicle and rear vehicle.

14. The congestion-based ACC system of claim 13, wherein the processor is configured to generate the at least one control signal to position the vehicle substantially at a mid-point between the front vehicle and rear vehicle.

15. The congestion-based ACC system of claim 13, wherein the processor is configured to generate at least one weight value for the at least one control signal to position the vehicle substantially at a relative mid-point between the front vehicle and rear vehicle.

16. The congestion-based ACC system of claim 13, further comprising a lane camera operatively coupled to the processor, wherein the processor is configured to generate a further control signal to control lateral movement of the vehicle based on the lane camera data.

17. The congestion-based ACC system of claim 13, wherein the processor is configured to process (i) and (ii) from the sensor arrangement to determine the velocity value if the processor determines a congestion status is active.

18. The congestion-based ACC system of claim 17, further comprising vehicle sensors for receiving vehicle use characteristic data, wherein the processor is configured to determine the congestion status is active using the vehicle use characteristics.

19. The congestion-based ACC system of claim 17, further comprising a navigation system for receiving traffic information from a network, wherein the processor is configured to determine the congestion status is active using the traffic information.

20. The congestion-based ACC system of claim 13, wherein the sensor arrangement comprises radar sensors.

* * * * *